United States Patent [19]

Howland et al.

[11] Patent Number: 4,920,756

[45] Date of Patent: May 1, 1990

[54] TRANSPORT REFRIGERATION SYSTEM WITH DEHUMIDIFIER MODE

[75] Inventors: Leland L. Howland, Belle Plaine; David H. Taylor, Minneapolis, both of Minn.

[73] Assignee: Thermo King Corporation, Minneapolis, Minn.

[21] Appl. No.: 310,551

[22] Filed: Feb. 15, 1989

[51] Int. Cl.⁵ .............................................. F25B 29/00
[52] U.S. Cl. ........................................... 62/173; 62/90
[58] Field of Search ............. 62/173, 90, 176.5, 196.4, 62/228.4

[56] References Cited

U.S. PATENT DOCUMENTS

| | | | |
|---|---|---|---|
| 2,461,760 | 2/1949 | Newton | 62/524 |
| 2,691,488 | 10/1954 | Ghai | 236/44 C |
| 2,770,100 | 11/1956 | Raney | 62/196.4 X |
| 3,159,982 | 12/1964 | Schachner | 62/175 |
| 3,768,274 | 10/1973 | Fink | 62/159 |
| 3,798,920 | 3/1974 | Morgan | 62/173 |
| 3,938,348 | 2/1976 | Rickert | 62/97 |
| 3,945,217 | 3/1976 | Bashark | 62/151 |
| 4,182,133 | 1/1980 | Haas et al. | 62/93 |
| 4,207,751 | 6/1980 | Kampfenkel et al. | 62/141 |
| 4,313,314 | 2/1982 | Boyanich | 62/324.1 |
| 4,394,816 | 7/1983 | Voorhis | 62/205 |
| 4,441,335 | 4/1984 | Bonne | 62/324.6 |
| 4,735,055 | 4/1988 | Taylor et al. | 62/228.4 X |
| 4,744,223 | 5/1988 | Umezu | 62/176.5 |

FOREIGN PATENT DOCUMENTS

| | | | |
|---|---|---|---|
| 50113957 | 3/1977 | Japan | 62/176.1 |
| 58-60211 | 10/1984 | Japan | 62/176.1 |

Primary Examiner—William E. Wayner
Attorney, Agent, or Firm—D. R. Lackey

[57] ABSTRACT

A transport refrigeration system having a dehumidifying mode. During the dehumidifying mode, a main or primary condenser is effectively removed from the active refrigerant circuit and an auxiliary or secondary condenser located in a conditioned air flow path performs the condensing function. This arrangement enables an evaporator in the air flow path to continue to cool and remove moisture from the conditioned air after a predetermined set point temperature has been reached, without a significant reduction in temperature of the conditioned air returned to a served space, as heat removed from the conditioned air by the evaporator is returned to the conditioned air by the secondary condenser.

10 Claims, 5 Drawing Sheets

TRANSPORT REFRIGERATION SYSTEM WITH DEHUMIDIFIER MODE

TECHNICAL FIELD

The invention relates in general to transport refrigeration systems, and more specifically to a transport refrigeration system with a dehumidifier mode.

BACKGROUND ART

Transport refrigeration systems normally carry perishable or frozen foods. While the cooling function inherently removes moisture from the conditioned air, condensing upon the evaporator, it is usually not a requirement that moisture be removed, and indeed, conditioned air which is too dry may be detrimental to certain types of loads.

Recently, however, there as been an increasing demand for temperature controlled conditioned air which has as much moisture removed therefrom as possible. Loads such as partially processed metals which must be transported to another location without any rust formation, chemical products which may be changed chemically by moisture, such as chemical products in an intermediate chemical stage, photographic products, electronic products, and the like, will all benefit by being transported in a dry, temperature controlled atmosphere. A prior art approach to moisture removal places dehumidifiers in the load space which are powered by a separate alternator driven at the high speed setting of the associated transport refrigeration system. This adds substantially to the cost of the apparatus, it increases fuel consumption, and it occupies valuable load space.

DISCLOSURE OF THE INVENTION

Briefly, the present invention is a transport refrigeration system which has the capability of continuing to remove moisture from air in a served space, after the air has been reduced to a predetermined set point temperature, while continuing to hold the temperature of the air close to set point. When the dehumidifying mode is enabled, the transport refrigeration will go into this mode from a cooling mode when a temperature sensor detects that the conditioned air has been reduced to set point. Instead of the system going into null, or into a heating mode, the dehumidifying mode continues the cooling mode, which continues to remove moisture from the conditioned air by condensation upon an evaporator.

Heat removed from the conditioned air during the dehumidifying mode, however, instead of being rejected to the atmosphere by a condenser, is rejected back into the conditioned air. This is accomplished by locating a secondary condenser in the conditioned air path, and by a control and valve arrangement which selects the secondary condenser during the dehumidifying mode, and which completely by-passes the conventional condenser.

Should the temperature of the conditioned air rise above set point, the system switches back to a normal cooling mode, "exchanging" the condensers, and removal of moisture continues. If the dehumidifying mode results in the temperature of the conditioned air dropping to a predetermined value below set point, the system changes to a heating mode in which hot gas from a compressor is directed through the evaporator, with both the conventional and secondary condensers being inactive. Once the heating mode raises the temperature of the conditioned air to a predetermined value, the system switches back to the dehumidifying mode.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
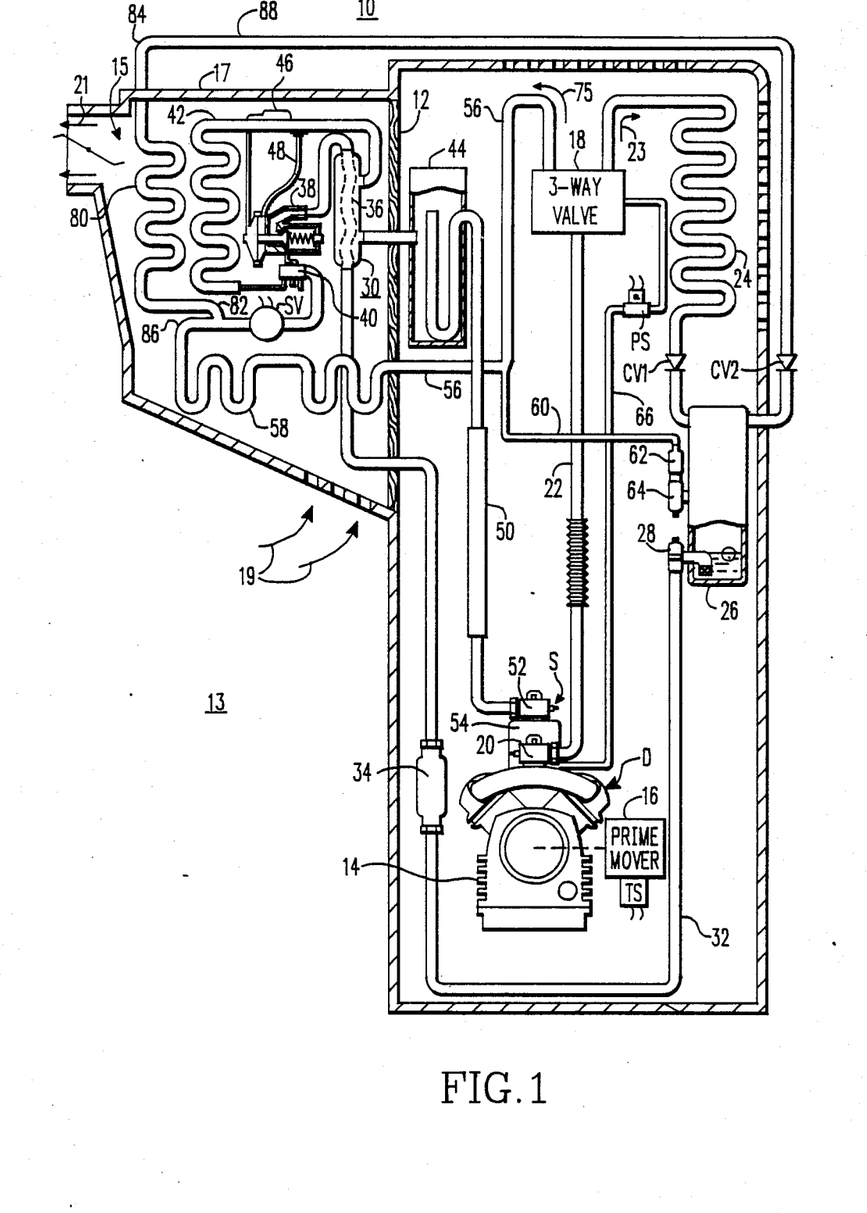
FIG. 1 is a piping diagram of a transport refrigeration system constructed according to the teachings of the invention.

Referring now to the drawings, and to FIG. 1 in particular, there is shown a transport refrigeration system 10 constructed according to a first embodiment of the invention. Transport refrigeration system 10 will first be described without the modification of the present invention. Refrigeration system 10 is mounted on the front wall 12 of a truck or trailer which defines a served space 13 containing air to be conditioned by system 10. An air flow path 15 for conditioned air is defined by an evaporator section 17 of system 10, with return air from the served space 13, indicated by arrows 19, being drawn into evaporator section 17 by suitable blowers or fans, and then discharged back into the served space 13, as indicted by arrows 21. U.S. Pat. No. 4,736,597, which is assigned to the same assignee as the present application, illustrates an exemplary air delivery system which may be used, and this patent is hereby incorporated into the specification of the present application by reference.

Refrigeration system 10 includes a closed refrigerant circuit which includes a refrigerant compressor 14 driven by a prime mover 14, such as a Diesel engine. Discharge ports D of compressor 14 are connected to an inlet port of a three-way valve 18 via a discharge service valve and a hot gas conduit or line 22. The functions of three-way valve 18, which has heating and cooling cycle positions, may be provided by separate valves, if desired.

One of the output ports of three-way valve 18 is connected to the inlet side of a condenser coil 24. This port is used as the cooling position of three-way valve 18, and it connects compressor 14 in a first refrigerant circuit 23. Ambient air is drawn over condenser coil 24 by suitable fans or blowers, and discharged to the atmosphere. The outlet side of condenser coil 24 is connected to the inlet side of a receiver tank 26 via a one-way condenser check valve CV1 which allows refrigerant flow only from the outlet side of condenser coil 24 to the inlet side of receiver tank 26. An outlet valve 28 on receiver tank 26 is connected to a heat exchanger 30 via a liquid line 32 which includes a dehydrator 34.

Liquid refrigerant from liquid line 32 continues through a coil 36 in heat exchanger 30 to an expansion valve 38. The outlet of expansion valve 38 is connected to a distributor 40 which distributes refrigerant to inlets on the inlet side of an evaporator coil 42. The outlet side of evaporator coil 42 is connected to the inlet side of a closed accumulator tank 44 by way of heat exchanger 30. Expansion valve 38 is controlled by an expansion valve thermal bulb 46 and an equalizer line 48. Gaseous refrigerant in accumulator tank 44 is directed from the outlet side thereof to the suction port S of compressor 14 via a suction line 50, a suction line service valve 52, and a suction throttling valve 54.

In the heating position of three-way valve 18, a hot gas line 56 extends from a second outlet port of three-way valve 18 to the inlet side of evaporator coil 42 via a defrost pan heater 58 located below evaporator coil 42. A by-pass conduit or pressurizing tap 60 extends from hot gas line 56 to receiver tank 26 via by-pass and service check valves 62 and 64, respectively.

A conduit 66 interconnects three-way valve 18 with the intake side of compressor 14 via a normally closed, electrically operated pilot solenoid valve PS. U.S. Pat. No. 4,748,818 illustrates and describes three-way valve 18 in detail, and this patent is hereby incorporated into the present application by reference. When solenoid operated valve PS is closed, three-way valve 18 is spring biased to the cooling position, to direct hot, high pressure gas from compressor 14 to condenser coil 24. Condenser coil 24 removes heat from the gas and condenses the gas to a lower pressure liquid. When evaporator 42 requires defrosting, and also when a heating mode is required to hold a thermostat set point temperature of a load being conditioned in served space 13, pilot solenoid valve PS is opened via voltage provided by a control function 72 shown in FIG. 2. Compressor pressure then overcomes the spring bias, operating three-way valve 18 to its heating position, in which flow of refrigerant to condenser 24 is prevented and flow to evaporator 42 is enabled. The heating position of three-way valve 18 diverts the hot high pressure discharge gas from compressor 14 from the first or cooling mode refrigerant circuit 23 into a second or heating mode refrigerant circuit 75 which includes hot gas line 56, defrost pan heater 58, distributor 40, and the evaporator coil 42. Expansion valve 38 is by-passed during the heating mode. If the heating mode is a defrost cycle, an evaporator fan 73 (FIGS. 4 and 6) is not operated. During a heating cycle required to hold a thermostat set point temperature, the evaporator fan 73 is operated.

Transport refrigeration system 10 is modified according to the teachings of the invention by providing a secondary or auxiliary condenser 80 having an input 82 and an output 84. The secondary condenser 80 is disposed in the air flow path 15 of the conditioned air such that the conditioned air flows through evaporator 42, through secondary condenser 80, and then into the served space 13. While secondary condenser 80 is illustrated as being separate from evaporator 42, it may utilize the last row of tubes in the evaporator 42, on the down stream side of the air flow path 15.

The secondary condenser 80 is connectable into the first refrigerant circuit such that when a dehumidifying mode or cycle is desired or required, hot gas from compressor 14 may be directed through the secondary condenser 80 instead of the main or primary condenser 24. Thus, the secondary condenser 80 effectively parallels the primary condenser 24, with valves and controls provided such that refrigerant in the form of hot gas from compressor 14 flows through a selected one of the condensers 14 or 80, but not both.

FIG. 1 illustrates a first embodiment of the invention in which a solenoid valve SV is placed between the outlet side 86 of the defrost pan heater 58 and the distributor 40. Depending upon how the control 72 is configured, valve SV may be normally open or normally closed. For purposes of example, it will be assumed that valve SV is normally open. The input side 82 of secondary condenser 80 is connected between the outlet side 86 of the defrost pan heater 58 and valve SV, and the output side 84 of secondary condenser 80 is connected to receiver tank 26 via a conduit 88 and a check valve CV2.

Figure 1A:
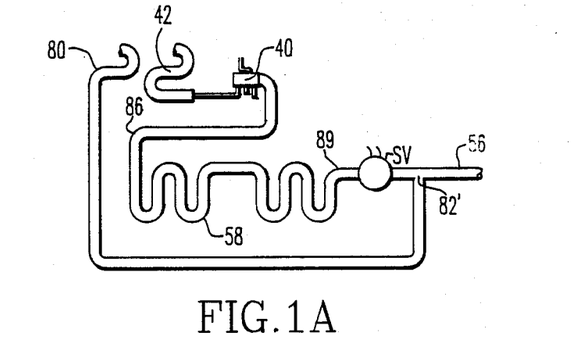
FIG. 1A illustrates a modification of FIG. 1 that may be used.

FIG. 1A illustrates an alternative placement of valve SV, in hot gas line 56 just prior to the entrance side 89 of defrost pan heater 58. In this instance the entrance side 82 to the secondary condenser 80 is also moved to the hot gas line 56, on the side of valve SV opposite to the side which is connected to defrost pan heater 58. Entrance side 82 to the secondary condenser 80 is referenced 82' in FIG. 1A.

When three-way valve 18 is spring biased to its cooling cycle position, the first refrigerant circuit operates normally, to provide a normal cooling mode. The first refrigerant circuit 23 starts at the discharge side D of compressor 14 and, in addition to three-way valve 18, includes condenser 14, receiver 26, expansion valve 38, evaporator 42, and accumulator 44, returning to the suction side S of compressor 14.

When three-way valve 18 is operated to the heating cycle position, the second refrigerant circuit 75 operates normally if normally open solenoid valve SV is open. The second refrigerant circuit starts at the discharge side D of compressor 14 and it includes three-way valve 18, defrost pan heater 58, distributor 40 evaporator coil 42, and accumulator 44, returning to the suction side of compressor 14.

When a dehumidifying mode is initiated, three-way valve 18 is operated to the heating position and solenoid valve SV is closed. Thus, it would appear that with the three-way valve 18 in the heating position that the second refrigerant circuit 75 would be followed. In actuality, the secondary condenser 80 is placed into the first refrigerant circuit 23, and the primary condenser 24 is removed from any active refrigeration circuit. In the FIG. 1 embodiment, the modified first refrigerant circuit starts at the discharge side D of compressor 14 and it includes three-way valve 18, defrost pan heater 58, secondary condenser 80, receiver 26, expansion valve 38, distributor 40, evaporator 42, and accumulator 44, returning to the suction side of compressor 14. In the FIG. 1A embodiment, the defrost pan heater 58 is by-passed, with the output of three-way valve 18 proceeding directly to secondary condenser 80. Thus, the dehumidifying mode or cycle continues the cooling cycle, which continues to cool the conditioned air below its dew point such that moisture condenses on the evaporator coil 42. Heat removed from the conditioned air by evaporator 42, however, instead of being rejected to the atmosphere by condenser 24, is rejected back into the conditioned air just before the conditioned air is returned to the served space 13. Thus, the dehumidifying effect of the normal cooling cycle is continued after the temperature of the served space 13 has been reduced to a selected set point temperature, with the temperature of the conditioned air remaining near set point. Once set point is reached, any heat removed should be returned to the conditioned air, and the invention does just that, without any adjustments being required.

Figure 2:
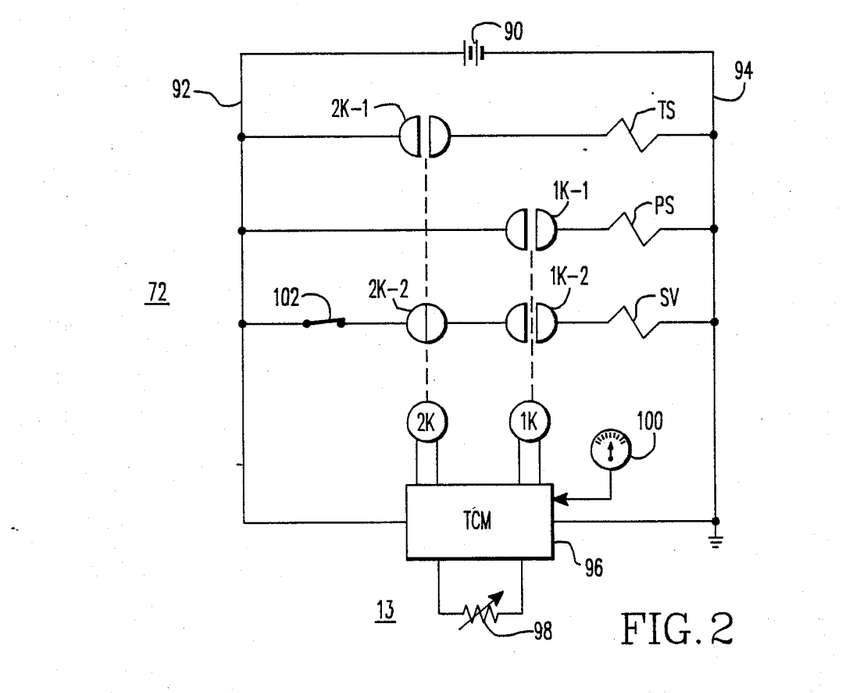
FIG. 2 is a control schematic diagram illustrating control devices which operate at predetermined temperatures relative to a selected set point temperature to initiate cooling, dehumidifying and heating modes for the transport refrigeration system shown in FIG. 1.

FIG. 2 is a schematic diagram of control 72 which may be used to operate transport refrigeration system 10 according to the teachings of the invention. Only those elements of the overall refrigeration control 72 are illustrated which are essential to the understanding of the invention. A source 90 of electrical energy, such as a battery, is connected to energize a pair of electrical conductors 92 and 94. A thermostat 96, called a temperature control module TCM, is connected between conductors 92 and 94. Thermostat 96 includes a temperature sensor 98 which is disposed to sense the temperature of the served space 13. Thermostat 96 also includes a heat relay 1K and a speed relay 2K which operate at predetermined temperatures relative to a temperature set point which is usually manually set to select the desired temperature of the served space, such as via a temperature set point selector 100.

Figure 3:
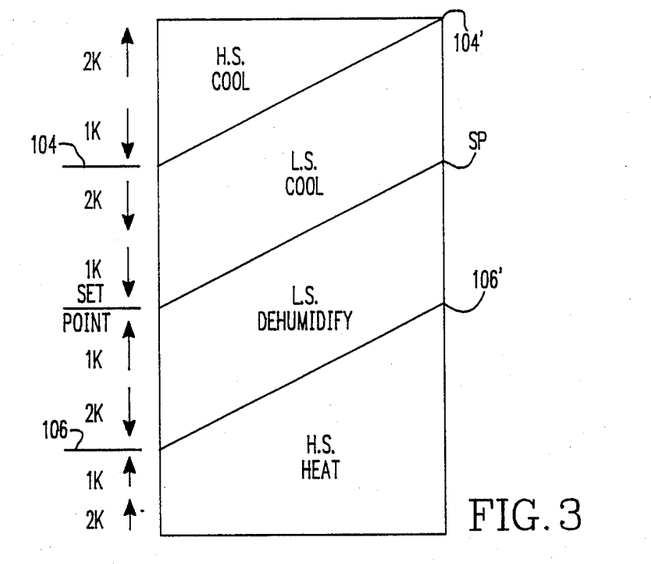
FIG. 3 is a diagram which illustrates the cooling, dehumidifying, and heating modes of the transport refrigeration system shown in FIG. 1.

FIG. 3 is a diagram which illustrates the sequence in which relays 1K and 2K operate for falling and rising temperatures in the served space. Operation with a falling temperature descends along the left-hand side of the diagram, and operation with a rising temperature ascends along the right-hand side. An upwardly pointing arrow indicates the associated relay is energized, and a downwardly pointing arrow indicates it is de-energized.

The heat relay 1K selects a cooling mode when it is de-energized and a heating mode when it is energized. Heat relay 1K includes two normally open contacts 1K-1 and 1K-2, as shown in FIG. 2. The speed relay 2K, when de-energized, selects a predetermined "low speed" of prime mover 16, such as 1400 RPM, and it selects a predetermined "high speed" when energized, such as 2200 RPM. The speed relay has a normally open contact 2K-1 and a normally closed contact 2K-2.

Normally open contact 1K-1 of heat relay 1K is connected to control the energization of the pilot solenoid PS. Normally open contact 2K-1 of speed relay 2K is connected to energize a throttle solenoid TS associated with prime mover 16, when the speed relay is energized. Normally open contact 1K-2 and normally closed contact 2K-2 of the heat and speed relays 1K and 2K, respectively, are serially connected with the solenoid valve SV between conductors 92 and 94. A switch 102 may be connected such that when closed it enables the dehumidifying mode, and when open it disables the dehumidifying mode.

With a falling temperature in the served space 13, when the temperature of the served space is above a predetermined temperature 104 relative to set point, such as during "pull down", the system will be in a high speed cooling mode. As shown in FIG. 3, the heat relay 1K will be de-energized and the speed relay 2K will be energized. The throttle solenoid TS will be energized by the closed contact 2K-1 to select "high speed", the open contact 2K-2 will block the operation of solenoid valve SV, contact 1K-1 will be open and thus the pilot solenoid PS will be de-energized to select the cooling mode, and contact 1K-2 will also be open to prevent solenoid valve SV from being energized.

When the sensed temperature drops below a predetermined temperature relative to set point, indicated at 104, the speed relay 2K drops out opening contact 2K-1. The throttle solenoid TS is thus de-energized, to select "low speed". Contact 2K-2 closes, but the open contact 1K-2 still prevents solenoid SV from being energized. The system 10 then operates in a low speed cooling mode.

When the sensed temperature drops below set point, the heat relay 1K is energized. Contacts 1K-1 and 1K-2 both close to energize pilot solenoid PS, which selects the "heat" position of three-way valve 18, and solenoid valve SV is energized to force the hot gas from compressor 14 to flow through the secondary condenser 80. Thus, instead of operating in a heat mode, which normally occurs when the pilot solenoid PS is energized, the cooling mode is continued without intentional further cooling of the conditioned air, due to the heating effect of the secondary condenser 80 which closely matches the cooling effect of the evaporator 42. The embodiment of the invention shown in FIGS. 1, 1A and 2 has the advantage of requiring, in addition to the secondary condenser 80, only a solenoid valve SV.

If the sensed temperature continues to drop until it falls below a predetermined temperature relative to set point, indicated at 106, the speed relay 2K will pick up, energizing the throttle solenoid TS via contact 2K-1, and de-energizing solenoid valve SV via contact 2K-2. The system thus switches to a high speed heating mode. Equalizer line 48 will close expansion valve 38, and thus the check valve CV2 will close off flow through the secondary condenser 80, to force all the hot compressor gas through the evaporator 42, to heat the conditioned air. When the temperature of the conditioned air relative to set point rises above a predetermined point 106', the system goes back to the low speed dehumidify mode just described. If the sensed temperature continues to rise and exceeds set point, the system will switch to low speed cool, and a further increase in temperature, above a predetermined point 104', will place system 10 in high speed cool.

Figure 4:
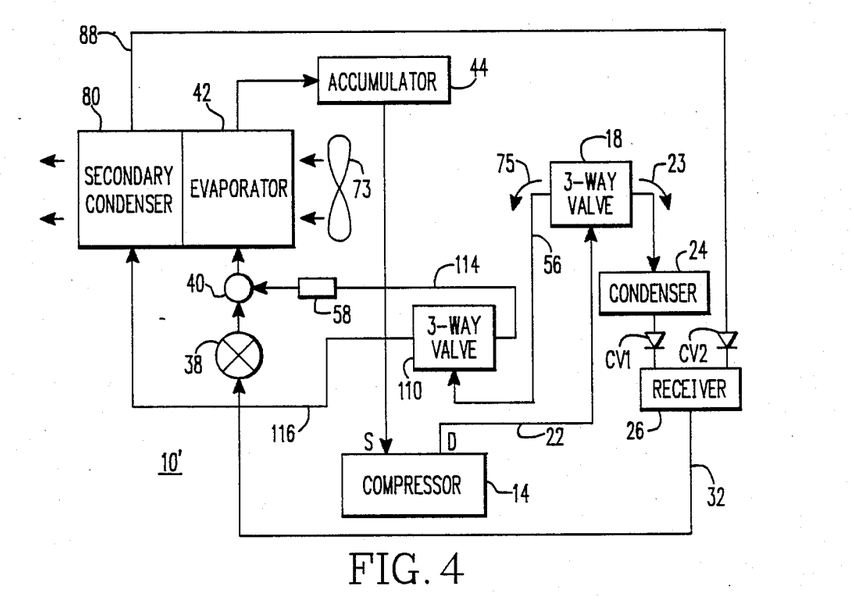
FIG. 4 is a schematic piping diagram setting forth an alternate embodiment of the invention.
Figure 5:
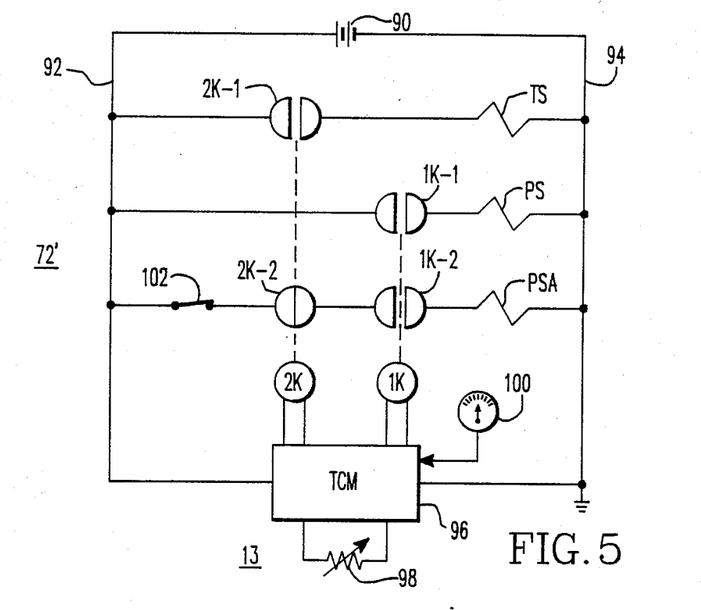
FIG. 5 is a control schematic diagram for the embodiment of the invention set forth in FIG. 4.

FIG. 4 is a schematic piping diagram of a transport refrigeration system 10' which is similar to system 10 except modified according to another embodiment of the invention. FIG. 5 is an electrical schematic diagram of control 72' for controlling system 10'. In system 10' a three-way valve 110 is used instead of solenoid valve SV. Three-way valve 110 is controlled by a pilot solenoid PSA shown in FIG. 5, which controls three-way valve 110 in the same manner as pilot solenoid PS controls three-way valve 18, as hereinbefore described. The normal "heat" output port of three-way valve 18, ie., the operative port when pilot solenoid PS is energized, is connected to the inlet of three-way valve 110 via conduit 56. The operative output port of three-way valve 110 when pilot solenoid PSA is de-energized is connected to the input of evaporator 42 via conduit 114, the defrost pan heater 58 and distributor 40. The operative output port of three-way valve 110 when pilot solenoid PSA is energized is connected to the input of secondary condenser 80 via conduit 116.

As shown in FIG. 5, the control 72' is identical to control 72 except that pilot solenoid PSA is substituted for solenoid valve SV. In the high and low speed cooling modes, three-way valve 110 is not in the operative refrigeration circuit. In heating and defrosting modes, pilot solenoid PSA is de-energized and three-way valve 110 directs hot gas received from three-way valve 18 to evaporator 42 via defrost pan heater 58 and distributor 40. In the dehumidifier mode, enabled when switch 102 is closed, both pilot solenoids PS and PSA, associated with three-way valves 18 and 110, respectively, will be energized, with three-way valve 110 directing hot gas directly into secondary condenser 80.

Figure 6:
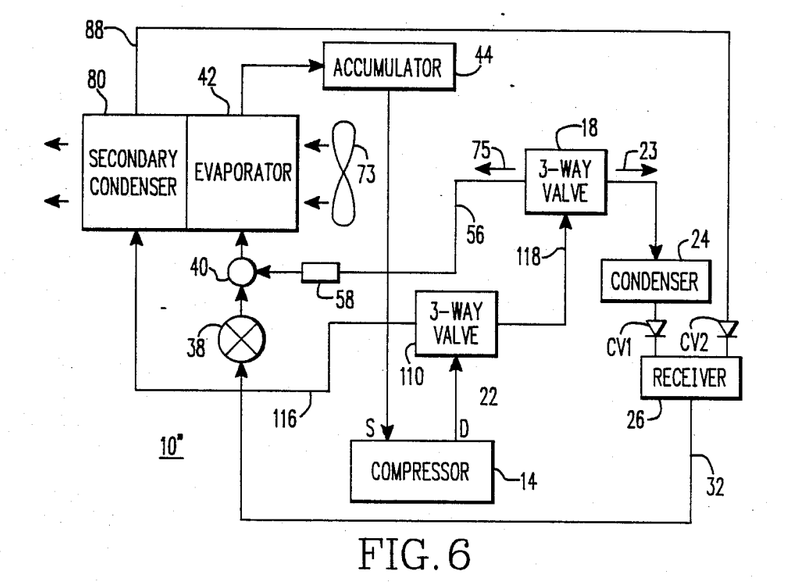
FIG. 6 is a schematic piping diagram which sets forth still another embodiment of the invention.

FIG. 6 is a schematic piping diagram of a transport refrigeration system 10″ constructed according to another embodiment of the invention which also uses a three-way valve 110 instead of solenoid valve SV. Three-way valve 110 is placed in a different position in system 10″ than in system 10′. Instead of three-way valve 110 obtaining its input from the active output of three-way valve 18 when pilot solenoid PS is energized, it receives its input directly from the discharge ports D of compressor 14. The active output of three-way valve 110 when pilot solenoid PSA is de-energized is connected to the input of three-way valve 18 via conduit 118. The active output of three-way valve 110 when pilot solenoid PSA is energized is connected to the input of secondary condenser 80 via conduit 116.

Figure 7:
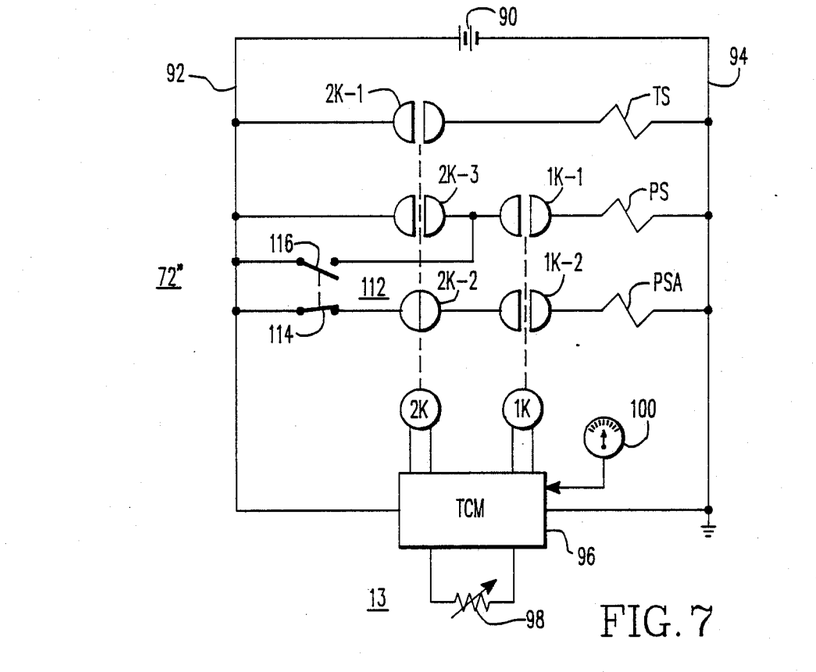
FIG. 7 is a control schematic diagram for the embodiment of the invention shown in FIG. 6.

Control 72″ shown in FIG. 7 is similar to control 72′ except: (1) speed relay 2K includes a normally open contact 2K-3 connected in series with pilot solenoid PS and normally open contact 1K-1 of the heat relay 1K; and (2) a ganged switch 112 replaces switch 102. Ganged switch 112 includes contacts 114 and 116 configured such that when one is closed the other is open. Contacts 114 are in the series circuit which includes pilot solenoid PSA, and contacts 116 are disposed to parallel contacts 2K-3. Thus, when switch 114 is operated to open contacts 114 and render the dehumidifying mode ineffective, contacts 116 close to effectively remove contacts 2K-3 from the circuit of pilot solenoid PS.

In high and low speed cool, the de-activated pilot solenoids PS and PSA cause three-way valves 110 and 18 to direct hot gas from compressor 14 to the primary condenser 24. In high speed heat, pilot solenoid PS is energized, while pilot solenoid PSA is de-energized, regardless of whether the dehumidifying mode has been enabled, resulting in hot gas being directed to evaporator 42. When the dehumidifying mode is enabled by switch 112, and the de-humidifier mode is called for, pilot solenoid PSA is energized, causing three-way valve 110 to direct hot gas from compressor 14 to secondary condenser 80.

In summary, there has been disclosed a new transport refrigeration system having an optional dehumidifying mode which continues to remove moisture from the air circulated through a served space: (1) after a cooling mode has reduced the load temperature to set point; and (2) after a heating mode has increased load temperature to a predetermined value relative to set point. Heat removed from the circulated conditioned air during the dehumidifier mode is re-introduced into the air down stream from the evaporator, between the evaporator and the served load, with very little loss. Thus, load temperature remains near set point, notwithstanding the continued removal of moisture by condensation on the evaporator. In general, the heat of rejection exceeds the heat of vaporization because of the heat of compression, and thus the system is automatically biased from the low speed dehumidify back towards low speed cool, rather than towards high speed heat, with both the low speed dehumidify and low speed cool modes being moisture removing modes.

We claim:

1. In a transport refrigeration system having an air flow path in communication with a served space for providing conditioned air controlled to a predetermined set point temperature via cooling and heating modes in which a refrigerant compressor respectively provides refrigerant in the form of hot gas for a first refrigerant circuit which includes an evaporator having an input and an output, with the evaporator being in the conditioned air flow path, a primary condenser having an input and an output, with the primary condenser being outside the conditioned air flow path, and an expansion valve disposed between the output of the primary condenser and the input of the evaporator, and for a second refrigerant circuit which by-passes the primary condenser and expansion valve and directs hot gas from the compressor to the input of the evaporator, a dehumidifying mode which removes moisture from the conditioned air without intentionally changing the temperature of the conditioned air, characterized by:

a secondary condenser having an input and an output, said secondary condenser being in the air flow path, means connecting said secondary condenser in parallel with the primary condenser, a prime mover for the compressor operable in a selected one of predetermined high and low speeds, and control means selecting the low prime mover speed during the dehumidifying mode, said control means effectively connecting the secondary condenser in the first refrigerant circuit during the dehumidifying mode, while effectively disconnecting the primary condenser from the first refrigerant circuit, whereby the evaporator cools and removes moisture from the conditioned air and the secondary condenser heats the conditioned air.

2. In the transport refrigeration system of claim 1 including a defrost pan heater, said defrost pan heater being in the second refrigerant circuit, with the control means effectively connecting both the secondary condenser and the defrost pan heater in the first refrigerant circuit during the dehumidifying mode, while effectively disconnecting the primary condenser from the first refrigerant circuit.

3. In a transport refrigeration system having an air flow path in communication with a served space for providing conditioned air controlled to a predetermined set point temperature via cooling and heating modes in which a refrigerant compressor respectively provides refrigerant in the form of hot gas for a first refrigerant circuit which includes an evaporator having an input and an output, with the evaporator being in the conditioned air flow path, a primary condenser having an input and an output, with the primary condenser being outside the conditioned air flow path, and an expansion valve disposed between the output of the primary condenser and the input of the evaporator, and for a second refrigerant circuit which by-passes the primary condenser and expansion valve and directs hot gas from the compressor to the input of the evaporator, a dehumidifying mode which removes moisture from the conditioned air without intentionally changing the temperature of the conditioned air, characterized by:

a secondary condenser having an input and an output, said secondary condenser being in the air flow path, means connecting said secondary condenser in parallel with the primary condenser, and control means for effectively connecting the secondary condenser in the first refrigerant circuit during the dehumidifying mode, while effectively disconnecting the primary condenser from the first refrigerant circuit, whereby the evaporator cools and removes moisture from the conditioned air and the secondary condenser heats the conditioned air, said cooling and heating modes respectively occurring above and below the predetermined set point temperature, with the control means selecting the dehumidifying mode in a temperature band below set point which extends from the set point temperature to a temperature which initiates the heating mode.

4. In a transport refrigeration system having an air flow path in communication with a served space for providing conditioned air controlled to a predetermined set point temperature via cooling and heating modes in which a refrigerant compressor respectively provides refrigerant in the form of hot gas for a first refrigerant circuit which includes an evaporator having an input and an output, with the evaporator being in the conditioned air flow path, a primary condenser having an input and an output, with the primary condenser being outside the conditioned air flow path, and an expansion valve disposed between the output of the primary condenser and the input of the evaporator, and for a second refrigerant circuit which by-passes the primary condenser and expansion valve and directs hot gas from the compressor to the input of the evaporator, a dehumidifying mode which removes moisture from the conditioned air without intentionally changing the temperature of the conditioned air, and wherein the cooling and heating modes respectively occur above and below the predetermined set point temperature, characterized by:

a secondary condenser having an input and an output, said secondary condenser being in the air flow path, means connecting said secondary condenser in parallel with the primary condenser, a prime mover for the compressor operable in a selected one of predetermined high and low speeds, and control means for selecting the dehumidifying mode in a temperature band below set point which extends from the set point temperature to a temperature which initiates the heating mode, said control means further selecting the low prime mover speed during the dehumidifying mode, said control means effectively connecting the secondary condenser in the first refrigerant circuit during the dehumidifying mode, while effectively disconnecting the primary condenser from the first refrigerant circuit, whereby the evaporator cools and removes moisture from the conditioned air and the secondary condenser heats the conditioned air.

5. In a transport refrigeration system having an air flow path in communication with a served space for providing conditioned air controlled to a predetermined set point temperature via cooling and heating modes in which a refrigerant compressor respectively provides refrigerant in the form of hot gas for a first refrigerant circuit which includes an evaporator having an input and an output, with the evaporator being in the conditioned air flow path, a primary condenser having an input and an output, with the primary condenser being outside the conditioned air flow path, and an expansion valve disposed between the output of the primary condenser and the input of the evaporator, and for a second refrigerant circuit which by-passes the primary condenser and expansion valve and directs hot gas from the compressor to the input of the evaporator, a dehumidifying mode which removes moisture from the conditioned air without intentionally changing the temperature of the conditioned air, characterized by:

a secondary condenser having an input and an output, said secondary condenser being in the air flow path, first and second check valves, first and second controllable valve means, a refrigerant receiver having an input and an output, said first controllable valve means being disposed to direct hot gas from the compressor to a selected one of the first and second refrigerant circuits, said second controllable valve means being disposed in the second refrigerant circuit between the first controllable valve means and the evaporator, said receiver being disposed in the first refrigerant circuit, between the primary condenser and the expansion valve, with the input of the primary condenser being connected to the first controllable valve means and with the output of the primary condenser being connected to the input of the receiver via the first check valve, means connecting said secondary condenser in parallel with the primary condenser, including conduit means connecting the input of the secondary condenser between the first and second controllable valve means, conduit means and said second check valve connecting the output of the secondary condenser to the input of the receiver, and control means for effectively connecting the secondary condenser in the first refrigerant circuit during the dehumidifying mode, while effectively disconnecting the primary condenser from the first refrigerant circuit, whereby the evaporator cools and removes moisture from the conditioned air and the secondary condenser heats the conditioned air.

6. In the transport refrigeration system of claim 5, wherein the control means effectively connects the secondary condenser in the first refrigerant circuit during the dehumidifying mode by operating the first valve means to select the second refrigerant circuit, and by operating the second valve means to block the second refrigerant circuit and direct the hot gas from the compressor into the first refrigerant circuit via the secondary condenser.

7. In a transport refrigeration system having an air flow path in communication with a served space for providing conditioned air controlled to a predetermined set point temperature via cooling and heating modes in which a refrigerant compressor respectively provides refrigerant in the form of hot gas for a first refrigerant circuit which includes an evaporator having an input and an output, with the evaporator being in the conditioned air flow path, a primary condenser having an input and an output, with the primary condenser being outside the conditioned air flow path, and an expansion valve disposed between the output of the primary condenser and the input of the evaporator, and for a second refrigerant circuit which by-passes the primary condenser and expansion valve and directs hot gas from the compressor to the input of the evaporator, a dehumidifying mode which removes moisture from the conditioned air without intentionally changing the temperature of the conditioned air, characterized by:

a secondary condenser having an input and an output, said secondary condenser being in the air flow path,
a first check valve,
first and second controllable valve means,
a refrigerant receiver having an input and an output,
said first controllable valve means being disposed to alternatively direct hot gas from the compressor to the secondary condenser or the second controllable valve means,
said second controllable valve means being disposed to direct hot gas from the first controllable valve means to a selected one of the first and second refrigerant circuits,
said receiver being disposed in the first refrigerant circuit, between the primary condenser and the expansion valve, with the input of the primary condenser being connected to the second controllable valve means and with the output of the primary condenser being connected to the input of the receiver via the first check valve,
means connecting said secondary condenser in parallel with the primary condenser, including the first controllable valve means which is connected to the input of the secondary condenser, and conduit means and a second check valve which connects the output of the secondary condenser to the input of the receiver,
and control means for effectively connecting the secondary condenser in the first refrigerant circuit during the dehumidifying mode, while effectively disconnecting the primary condenser from the first refrigerant circuit, whereby the evaporator cools and removes moisture from the conditioned air and the secondary condenser heats the conditioned air.

8. In the transport refrigeration system of claim 7, wherein the control means effectively connects the secondary condenser in the first refrigerant circuit during the dehumidifying mode by operating the first valve means to select the secondary condenser instead of the second controllable valve means.

9. In a transport refrigeration system having an air flow path in communication with a served space for providing conditioned air controlled to a predetermined set point temperature via cooling and heating modes in which a refrigerant compressor respectively provides refrigerant in the form of hot gas for a first refrigerant circuit which includes an evaporator having an input and an output, with the evaporator being in the conditioned air flow path, a primary condenser having an input and an output, with the primary condenser being outside the conditioned air flow path, and an expansion valve disposed between the output of the primary condenser and the input of the evaporator, and for a second refrigerant circuit which by-passes the primary condenser and expansion valve and directs hot gas from the compressor to the input of the evaporator, a dehumidifying mode which removes moisture from the conditioned air without intentionally changing the temperature of the conditioned air, characterized by:

a secondary condenser having an input and an output, said secondary condenser being in the air flow path,
a first and second check valves,
first and second controllable valve means,
a refrigerant receiver having an input and an output,
said first controllable valve means being disposed to alternatively direct hot gas from the compressor to the first refrigerant circuit or to the second controllable valve means, p1 said second controllable valve means being disposed to alternatively direct hot gas from the first controllable valve means to the second refrigerant circuit or to the secondary condenser,
said receiver being disposed in the first refrigerant circuit, between the primary condenser and the expansion valve, with the input of the primary condenser being connected to the first controllable valve means and with the output of the primary condenser being connected to the input of the receiver via the first check valve,
means connecting said secondary condenser in parallel with the primary condenser, including the first and second controllable valve means which connect the hot gas from the compressor to the input of the secondary condenser, and conduit means and a second check valve connecting the output of the secondary condenser to the input of the receiver,
and control means for effectively connecting the secondary condenser in the first refrigerant circuit during the dehumidifying mode, while effectively disconnecting the primary condenser from the first refrigerant circuit, whereby the evaporator cools and removes moisture from the conditioned air and the secondary condenser heats the conditioned air.

10. In the transport refrigeration system of claim 9, wherein the control means effectively connects the secondary condenser in the first refrigerant circuit during the dehumidifying mode by operating the first controllable valve means to select the second controllable valve means, and by operating the second controllable valve means to select the secondary condenser.

* * * * *